United States Patent [19]
Albrecht et al.

[11] Patent Number: 6,036,778
[45] Date of Patent: Mar. 14, 2000

[54] APPARATUS FOR PRODUCING LANGMUIR-BLODGETT FILM

[75] Inventors: Otto Albrecht, Atsugi; Hiroshi Matsuda, Isehara, both of Japan

[73] Assignee: Canon Kabushiki Kaisha, Tokyo, Japan

[21] Appl. No.: 09/086,519

[22] Filed: May 29, 1998

[30] Foreign Application Priority Data

May 30, 1997 [JP] Japan .................................. 9-142203

[51] Int. Cl.⁷ ...................................................... B05C 3/02
[52] U.S. Cl. ........................................ 118/402; 427/434.3
[58] Field of Search ......................... 118/402; 427/430.1, 427/434.3

[56] References Cited

U.S. PATENT DOCUMENTS

| | | | |
|---|---|---|---|
| 4,783,348 | 11/1988 | Albrecht et al. | 427/402 |
| 5,143,745 | 9/1992 | Maganas et al. | 118/402 |
| 5,512,326 | 4/1996 | Albrecht et al. | 427/430.1 |

FOREIGN PATENT DOCUMENTS

| | | |
|---|---|---|
| 518366 | 12/1992 | European Pat. Off. . |
| 8-001058 | 1/1996 | Japan . |
| 9-192842 | 7/1997 | Japan . |
| WO87/04090 | 7/1987 | WIPO . |

OTHER PUBLICATIONS

Nitsch, et al.; Connective Compression . . . Insoluble Films, Thin Solid Films, vol. 178 (1989) pp. 145–155 (no month date).

Peterson, et al.; "A New Model for . . . Film Layers", Thin Solid Films, vol. 109 (1983) pp. 371–378 (no month date).

Daniel, et al.; "Effect of Surface Flow . . . Films", J. Mol. Electr. vol. 1, (1985) pp. 97–104 (no month date).

Sugi, et al.; "Vertical Dipping Method . . . Films," Thin Solid Films, vol. 178 (1989) pp. 157–164 (no month date).

Albrecht, et al.; "Control of the homogeneity . . . in the Monolayer", Thin Solid Films, vol. 221 (1992) pp. 276–280 (no month date).

Albrecht, et al.; "Construction and use of LB . . . pilot production," Thin Solid Films, vols. 284–285 (1996) pp. 152–156 (no month date).

*Primary Examiner*—Katherine A. Bareford
*Attorney, Agent, or Firm*—Fitzpatrick, Cella, Harper & Scinto

[57] ABSTRACT

The present invention provides an apparatus for producing a Langmuir-Blodgett film including a water bath having a spread region for spreading a material for forming a single molecular film on a liquid surface, a compression region for compressing the material spread by the spread region to form a single molecular film, and a lamination region for laminating the single molecular film formed by the compression region on a substrate. The apparatus further includes a first flow path for discharging a liquid, which flows from the spread region of the water bath, to the outside of the water bath through the compression region and the lamination region, a first valve for controlling the amount of the liquid discharged through the first flow path, a second flow path for discharging the liquid, which flows from the spread region of the water bath, from the boundary between the compression region and the lamination region through the compression region, and a second valve for controlling the amount of the liquid discharged through the second flow path.

12 Claims, 7 Drawing Sheets

APPARATUS FOR PRODUCING LANGMUIR-BLODGETT FILM

BACKGROUND OF THE INVENTION

1. Field of the Invention

The present invention relates to an apparatus for producing a Langmuir-Blodgett film.

2. Description of the Related Art

A Langmuir-Blodgett film (LB film) is an organic film comprising a single molecular layer of the same or different organic materials or accumulated layers thereof, the thickness of the single molecular layer being determined by the length of each of molecules which constitute the single molecular layer. The term "LB film" is derived from Irving Langmuir and Katharine Blodgett who are famous researchers in this field. As employed herein the phrase "single molecular film" means the same as the phrase "monomolecular film".

The LB film is generally formed in accordance with the following procedure. First an amphipathic compound for forming the film is dissolved in an appropriate solvent. Next, a small amount of this solution is spread on the surface of a clean liquid, preferably pure water, and the solvent is evaporated or diffused into the adjacent water phase to disperse film-forming molecules on the water surface. At this time, the film-forming molecules are arranged so that the hydrophobic groups thereof face the vapor phase side, and the hydrophilic groups thereof face the water phase side. Then, a partition plate is mechanically swept on the water surface to decrease the surface area of the water surface on which the film-forming molecules are spread. As a result, the film formed by dispersion of the film forming molecules is compressed in the planar direction to increase the density, to obtain a dense single molecular film on the water surface. Next, a solid substrate is dipped and pulled up in the direction crossing the single molecular film with the density of the single molecular film on the water surface kept constant under appropriate conditions, to deposit a single molecular layer on the solid substrate. Such a dipping and pulling-up operation is repeated to deposit, on the solid substrate, a film comprising cumulative single molecular layers and having a thickness of an integral multiple of the thickness of the single molecular layer.

The density of the single molecular film on the water surface is monitored by measuring a difference between the surface tension of the clean water surface and the surface tension of a region on the water surface which is coated with the single molecular film, i.e., surface pressure. In the operation for forming the LB film as described above, the position of the partition plate must be controlled to keep the set surface pressure constant. Since the single molecular film on the water surface is transferred onto the substrate as deposition of the LB film proceeds, the partition plate must be moved in the direction to compress the single molecular film on the water surface in order to keep the surface pressure constant. As a result, the spread area of the single molecular film on the water surface decreases with time. At this time, although the single molecular film on the water surface flows to the substrate, the flow of the single molecular film on the water surface is nonuniform because the width (the length of the end surface of the single molecular film on the water surface, which contacts the partition plate) of a water bath is smaller than the width of the substrate, and the molecular film thus converges to the substrate. This state is shown in FIGS. 1A to 1C.

Figure 1A:
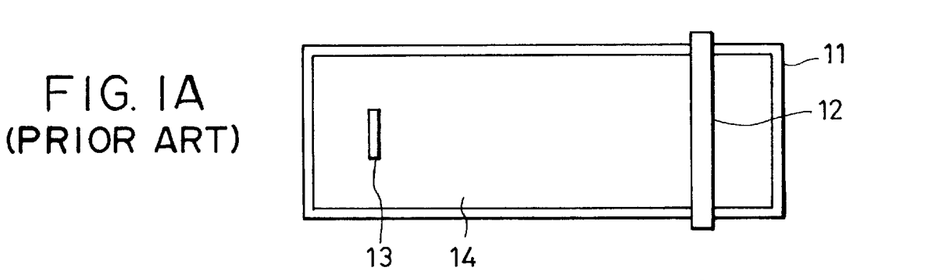
FIGS. 1A, 1B and FIG. 1C are top views illustrating the schematic construction of a conventional apparatus for producing a LB film by batch processing, and the flow state of a single molecular film on a water surface in production of the LB film by using the apparatus.
Figure 1B:
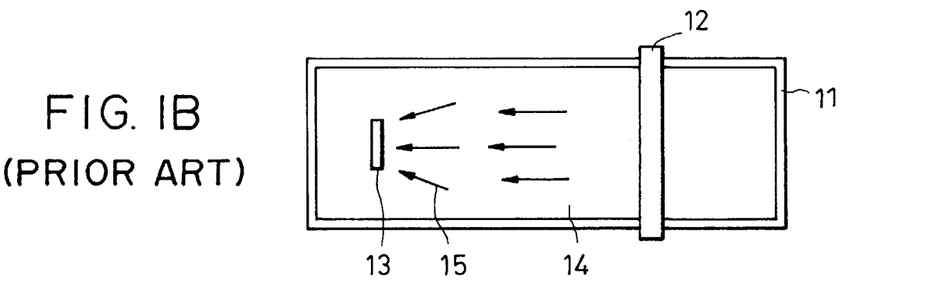
Figure 1C:
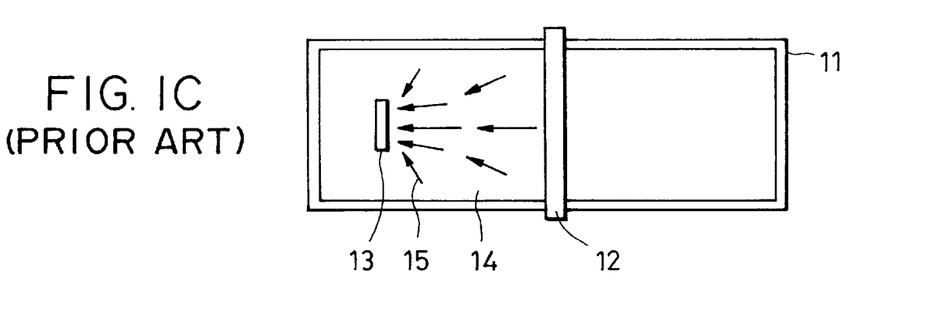

All FIGS. 1A to 1C are plan views of a LB film-forming apparatus comprising a water bath 11, a partition plate 12 and a surface pressure gauge (not shown in the drawing). In FIG. 1A, it is assumed that a single molecular film 14 on the water surface has already reached to desired surface pressure. In order to keep the surface pressure constant while transferring the single molecular film 14 on the water surface to a substrate 13, the partition plate 12 is moved in the direction of compression of the single molecular film 14 on the water surface. Each of Figs. 1B and 1C shows a state in the course of deposition of the LB film on the substrate. In the drawings, arrows 15 schematically show the flow (the flow direction) of the single molecular film on the water surface. As seen from the drawings, the flow of the single molecular film on the water surface strongly converges to the substrate, particularly, near the substrate, as deposition of the LB film proceeds. Consequently, for example, in a case in which the single molecular film on the water surface has a crystalline domain structure, as a single molecular film comprising a fatty acid on the water surface, the initial domain shape, which is relatively amorphous, is changed to a shape having a long axis in the direction of compression of the film near the substrate, and thus the resultant LB film also has a domain long axis in the pulling-up direction of the substrate (for example, refer to M. F. Daniel and J. T. T. Hart, Journal of Molecular Electronics, Vol. 1, pp. 97–104 (1985), M. Sugi, N. Minari, K. Ikegami, S. Kuroda, K. Saito, and M. Saito, Thin Solid Films, Vol. 178, pp. 157–164 (1989), and O. Albrecht, H. Matsuda, K. Eguchi, and T. Nakagiri, Thin Solid Films, Vol. 221, pp. 76–280 (1992)).

A single molecular film comprising a polymer on the water surface has the tendency that the polymer main chains are made parallel to the compression direction of the film by deposition on the substrate, and the resultant LB film tends to be oriented so that the polymer main chains are parallel to the direction of pulling-up of the substrate.

As described above, the LB film has unexpected anisotropy, but manifestation of such anisotropy is very important and necessary for some applications. For example, in a case in which a polymer LB film of polyimide or the like is used as a liquid crystal alignment film, the polymer main chains have previously been arranged in a direction, and thus uniform liquid crystal alignment can be achieved without rubbing (the process of rubbing a liquid crystal alignment layer in an amorphous state with rotating cloth in a direction). Also the use of a LB film having anisotropy permits formation of an optical device utilizing optical anisotropy, such as a polarizer or the like.

The LB film is conventionally produced by batch processing, as described above, and the amount of the film which can be formed by one operation is limited by the area of the single molecular film first formed on the water surface. Namely, the amount cannot be larger than the surface area of the water bath, and is actually smaller than the surface area of the water bath because the surface of the water bath is partitioned by using the partition plate. Therefore, where a film having an area larger than the single molecular film first formed on the water surface must be deposited on the substrate, excess single molecular films on the water surface (the single molecular film on the water surface which is smaller than the area of deposition on the substrate in one operation of moving the substrate upward and downward, and the single molecular film on the water surface which is present in a region where the single molecular film on the water surface cannot be compressed by moving the partition plate due to mechanical limitation of the apparatus) is removed, and then a single molecular film must be formed again on the water surface through the process comprising spreading film molecules and compressing again. This causes a problem of productivity.

Where anisotropy is introduced into the LB film, the productivity further deteriorates for the following reasons. Immediately after the single molecular film is formed on the water surface by using the apparatus shown in FIGS. 1A to 1C, substantially no anisotropy is manifested in the single molecular film on the water surface. If anisotropy is manifested, anisotropy is manifested by the operation of compressing the single molecular film on the water surface by moving the partition plate, and thus the long axis direction of molecules is parallel to the partition plate (the direction perpendicular to the flow direction 15 of the single molecular film on the water surface shown in FIGS. 1A to 1C). As described above, the mechanism for manifesting anisotropy in the single molecular film on the water surface comprises two-dimensional stress deformation of the film caused by the flow of the single molecular film on the water surface toward a specified point (in this case, the point of the depositing operation) due to deposition on the substrate. Therefore, in order to provide the single molecular film having uniform anisotropy on the water surface, a second substrate (a substrate different from the substrate used for a target sample) must be used in deposition operations to remove an appropriate amount of single molecular film on the water surface from the specified point and form a (pseudo) stationary flow of the single molecular film on the water surface. As a result, the amount of the LB film having anisotropy which can be formed by one deposition operation is reduced by an amount corresponding to the amount of the single molecular film on the water surface removed for forming the stationary flow, thereby further deteriorating productivity. Conversely, if an operation of depositing on a desired substrate is performed before the (pseudo) stationary flow of the single molecular film is formed on the water surface, the magnitude of anisotropy gradually changes as the deposition operation proceeds, and thus it is difficult to obtain uniform anisotropy.

In order to overcome the deterioration in productivity of LB film production, some methods of continuously producing a LB film are disclosed. Typical examples of such methods include the methods disclosed in O. Albrecht et al., U.S. Pat. No. 4,783,348 and Japanese Patent Laid-Open No. 8-001058, and W. Nitsch et al., Thin Solid Films, Vol. 178, pp. 140–150 (1985).

The apparatus of continuously producing a LB film disclosed by O. Albrecht et al. and the outline of the film deposition process thereof will be described below with reference to FIG. 2.

Figure 2:
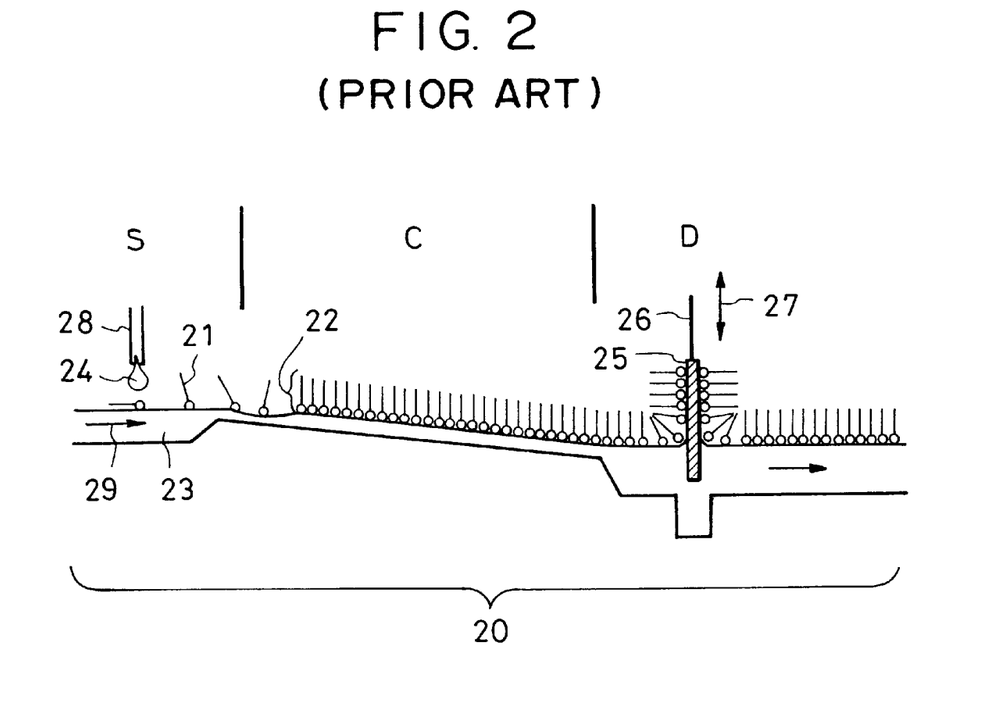
FIG. 2 is a schematic drawing of the construction of a conventional apparatus for continuously producing a LB film.

The apparatus shown in FIG. 2 comprises a water bath 20 roughly composed of three regions, i.e., a spread region S, a compression region C, and a deposition region D, a liquid (typically, pure water) serving as sub-phase water 23 continuously flowing in the direction from the region S to the region D through the region C.

In the region S, a spread solution 24 in which film forming molecules 21 are dissolved is added dropwise onto the sub-phase water 23 through a nozzle 28. Then the solvent of the spread solution 24 is removed by evaporation, and the film forming molecules 21 are continuously moved toward the region C along a water flow 29. In the region C, the film forming molecules 21 are compressed to form a single molecular film 22 comprising the film forming molecules 21 arranged in a direction over the range of from the region C to the region D. In order to uniformly continuously compress the film forming molecules 21, in the region C, a stable water flow is essential, and thus the water bath 20 is formed so that the water surface in the region C slightly slopes downward along the water flow. In the region D, a substrate 25 connected to a substrate moving mechanism 26 is repeatedly dipped and pulled up in the direction perpendicular to the water surface, as shown by an arrow 27 to continuously deposit the single molecular film 22 on the water surface on the surface of the substrate 25, to obtain a LB film.

In the above-mentioned method and apparatus, where a predetermined amount of film forming molecules has already been present in the system, the film forming molecules 21 continuously supplied are moved until they are stopped by the end of the single molecular film 22 formed on the water surface over the range from the region C to the region D. Therefore, dropwise addition of the film forming molecules 21 is accompanied with growth of the single molecular film 22 on the water surface in the upstream direction opposite to the water flow unless the single molecular film 22 on the water surface is not removed from the region C or D (including the operation of depositing on the substrate). At this time, the pressure gradient in the single molecular film 22 on the water surface is increased by frictional force generated between the single molecular film 22 formed on the water surface and the sub-phase water 23, thereby increasing the surface pressure of the single molecular film 22 on the water surface. The ultimate surface pressure in the deposition region D is determined by the level of the sub-phase water, the strength of the water flow, the water temperature, the length and the degree of the downward slope in the region C, etc. In order to make uniform the quality (surface pressure) of the single molecular film on the water surface in the region D, it is essential to uniformly compress the film-forming molecules and the single molecular film on the water surface in the region C. Therefore, the water flow in the region C is preferably a laminar flow, and the shape of the water bath 20 is designed to decrease (typically, about 2 to 8 mm) the thickness (the distance between the water surface and the bottom of the water bath) of the sub-phase water in the region C. Also, in order to obtain the stationary water flow, in the region C, the sub-phase water 23 is caused to flow into the water bath, and flow out from the region D. In order to save the sub-phase water 23 used, the sub-phase water 23 caused to flow out from the region D is generally returned to the region S by using a pump.

In order to keep the surface pressure of the single molecular film 22 on the water surface at the predetermined value, two loops are used, which include a control loop for controlling the spread rate of the film forming molecules 22, and a control loop for keeping the level of water in the region D at the predetermined value by controlling the amount of the sub-phase water 23 held in the water bath 20.

Figure 3A:
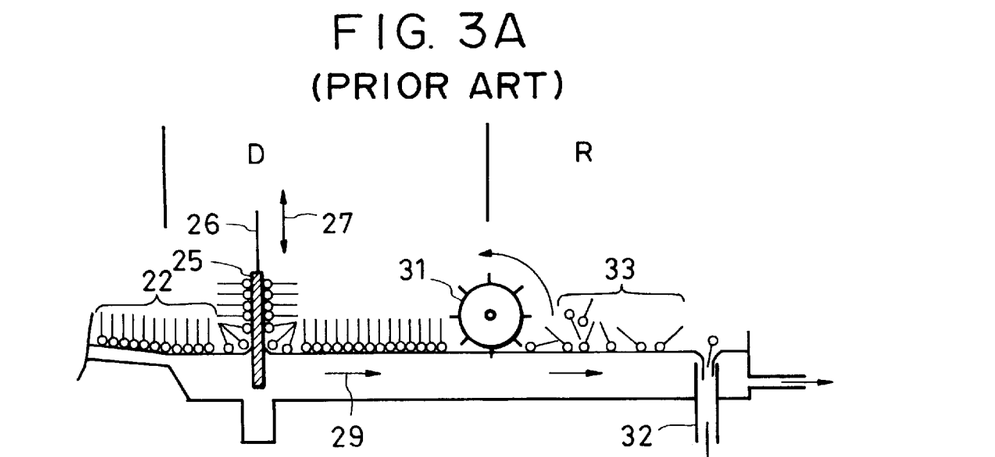
FIG. 3A is a schematic drawing of the construction of a conventional apparatus for continuously producing a LB film, for illustrating a mechanism for removing single molecules.
Figure 3B:
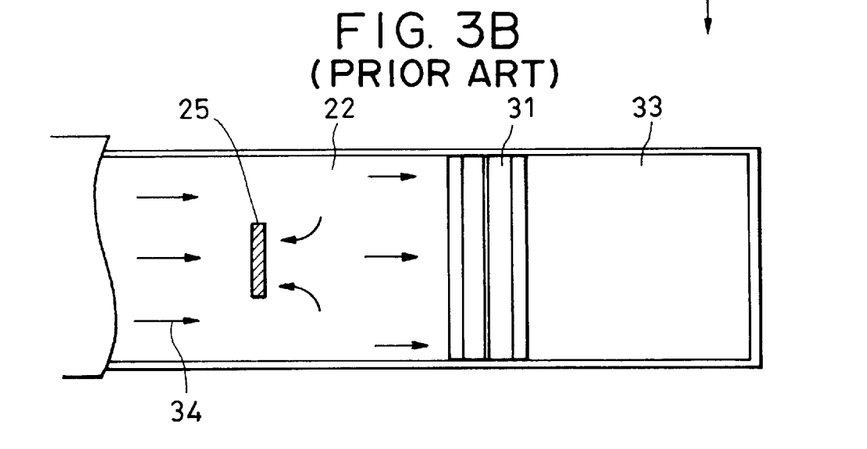
FIG. 3B and FIG. 3C are top views each illustrating the flow state of a single molecular film in the apparatus shown in FIG. 3A.
Figure 3C:
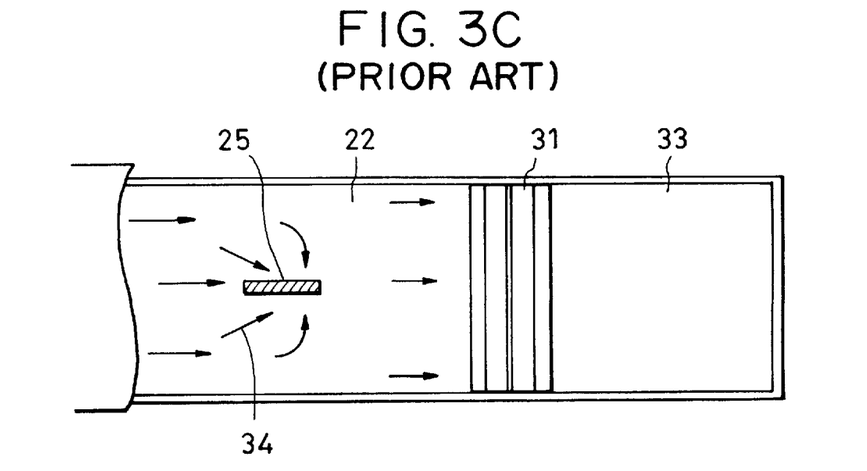

The region D is followed by a mechanism for stationarily removing the single molecular film on the water surface which is not used for deposition on the substrate. FIGS. 3A to 3C show an example of mechanisms for removing the single molecular film on the water surface. FIG. 3A is a schematic sectional view, and FIGS. 3B and 3C are top views. In the drawings, a rotatable impeller 31 has the function to move the single molecular film 22 on the water surface present in the region D toward the removal region R, and has the function as a bulkhead for preventing excess film molecules 33 sent to the removal region D from flowing backward to the region D. The excess film molecules 33 sent to the removal region R may be removed from the region R by using an aspirator 32 or the like.

The rate of removal of the single molecular film on the water surface is set so that the sum of the amount of the single molecular film on the water surface removed per unit time by such a removal mechanism and the amount of the single molecular film on the water surface deposited on the substrate is substantially equal to the amount of the single molecular film on the water surface newly produced by continuously spreading film molecules. In this case, as shown by arrows 34 in FIG. 3B, both the flow rate and direction of the flow of the single molecular film on the water surface are made uniform, and the residence time required until the single molecular film on the water surface is deposited on the substrate after the formation thereof can be kept substantially constant. The residence time required until the single molecular film on the water surface is deposited on the substrate is a factor which influences the quality of the single molecular film on the water surface (for example, in I. R. Peterson, G. J. Russell, and G. G. Roberts, Thin Solid Films, Vol. 109, pp. 371–378 (1983), it is disclosed that in a single molecular film of a fatty acid on a water surface, the viscosity of the single molecular film on the water surface increases as the residence time increases). Therefore, in order to control the quality of the LB film, it is advantageous that the residence time can be kept constant.

In the use of the above operation, where the substrate 25 is arranged so that the surface of the substrate 25 is perpendicular to the water flow 29, as shown in FIG. 3B, substantially no anisotropy is manifested in the LB film deposited on the surface of the substrate which faces the upstream side. On the surface of the substrate 25 which faces the downstream side, the flow of the single molecular film 22 on the water surface is complicated near the substrate, with some stress deformation, but high anisotropy is not manifested in the LB film deposited on this surface. Where the substrate 25 is arranged so that the surface thereof is parallel to the water flow 29, as shown in FIG. 3C, the single molecular film 22 on the water surface is just subjected to stress deformation near the substrate 25, and thus high anisotropy is not manifested in the deposited LB film.

In order to produce the LB film having anisotropy by using the continues LB film producing apparatus, a method is possibly used in which the removal of the single molecular film on the water surface is stopped so that in the region D, the flow of the single molecular film on the water surface is generated only by the operation of depositing the LB film, as in the batch process shown in FIGS. 1A to 1C. In this case, of course, the flow rate of the single molecular film on the water surface has dependency on position, and thus the residence time required until the single molecular film on the water surface is deposited on the substrate after formation thereof is strictly kept constant with difficulty. However, even in such an operation, the water flow 29 is actually present in the region D, and thus the single molecular film 22 on the water surface tends to move in the downstream direction as a whole. As a result, local stress deformation of the single molecular film on the water surface is relieved, thereby decreasing the magnitude of anisotropy manifested in the LB film.

SUMMARY OF THE INVENTION

Accordingly, it is an object of the present invention to provide an apparatus having the function to continuously form a LB film and capable of producing a LB film having high anisotropy according to demand.

In order to achieve the object of the present invention, there is provided an apparatus for producing a Langmuir-Blodgett film comprising:

a water bath having a spread region for spreading a material for forming a single molecular film on a liquid surface, a compression region for compressing the material spread in the spread region to generate a single molecular film, and a lamination region for laminating the single molecular film produced in the compression region on a substrate;

a first flow path for discharging the liquid which flows in from the spread region of the water bath to the outside of the water bath through the compression region and the lamination region;

a first valve for controlling the amount of the liquid discharged through the first flow path;

a second flow path for discharging the liquid which flows in from the spread region of the water bath from the boundary between the compression region and the lamination region through the compression region; and a second valve for controlling the amount of the liquid discharged through the second flow path.

DESCRIPTION OF THE PREFERRED EMBODIMENT

An apparatus for producing a LB film of the present invention has two flow paths including a second flow path capable of stationarily flowing sub-phase water from a spread region to the boundary between a compression region and a lamination region, and a first flow path capable of stationarily flowing the sub-phase water from the spread region to the lamination region through the compression region. Therefore, by closing the second flow path to use the first flow path, and removing the single molecular film on the water surface at a constant rate, like in a conventional apparatus for continuously producing a LB film, it is possible to form the LB film while controlling the residence time of the single molecular film on the water surface of the sub-phase water. On the other hand, when the first flow path is closed to use only the second path, and removal of the single molecular film on the water surface using a removal mechanism is stopped, a flow of the single molecular film on the water surface is produced only by deposition on a substrate in the region D, and a LB film having anisotropy of the same magnitude as the anisotropic LB film formed by batch processing can be formed. Further, the single molecular film on the water surface can continuously be formed, and thus the flow of the single molecular film on the water surface is brought into a substantially pseudo stationary state after the predetermined time has passed from the start of deposition on the substrate. Therefore, by forming the LB film by using only the single molecular film on the water surface in the pseudo stationary state, a LB film having anisotropy of uniform magnitude can simply be formed regardless of the thickness of the LB film. In order to form such a pseudo stationary flow, a LB film may be formed on an unnecessary portion of a sample to be formed or a second substrate until the pseudo stationary flow is formed. Alternatively, the single molecular film on the water surface may be removed from the vicinity of the deposition portion by using an aspirator in place of formation of the LB film.

Figure 7:
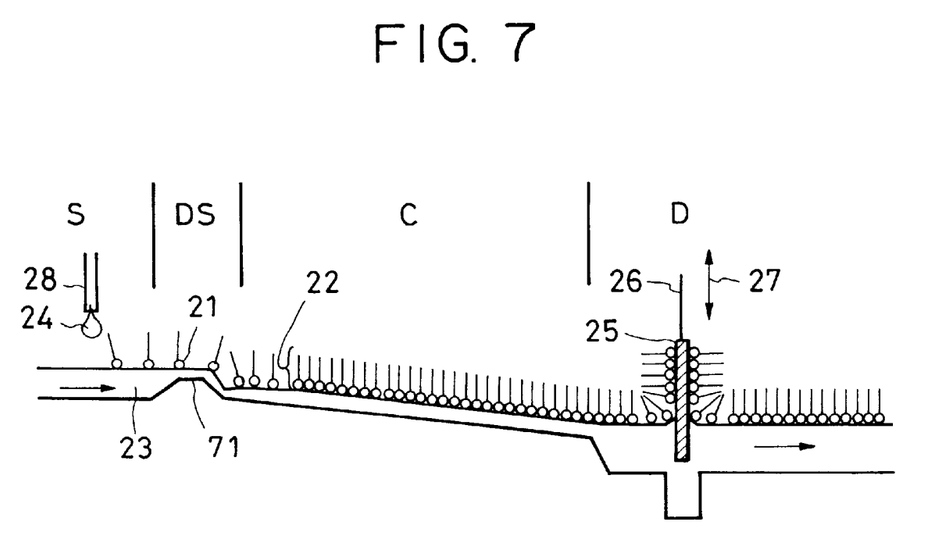
FIG. 7 is a schematic drawing illustrating the construction of an example in which a LB film producing apparatus of the present invention comprises a separation region.

In order to stably control the surface pressure during film formation, as disclosed in Japanese Application No. 8-001058, a separation region DS is preferably provided between the spread region S and the compression region C. FIG. 7 is a schematic drawing showing the structure of the separation region DS. In FIG. 7, the same members as FIGS. 2 and FIGS. 3A to 3C are denoted by the same reference numerals, and detailed description is omitted. In the separation region DS, an appropriate difference 71 in height is provided between the spread region S and the compression region C so that the level of water in the spread region S is higher than the compression region C. Such setting of the level of water can prevent mutual interference and division between a control loop for controlling the rate of spread of film-forming molecules and a control loop for controlling the level of water in the lamination region D, both of which are provided for keeping the surface pressure of the single molecular film on the water surface at a predetermined value. As a result, it is possible to keep a variation in the surface pressure low during film formation, and stably provide a high-quality LB film.

Figure 4:
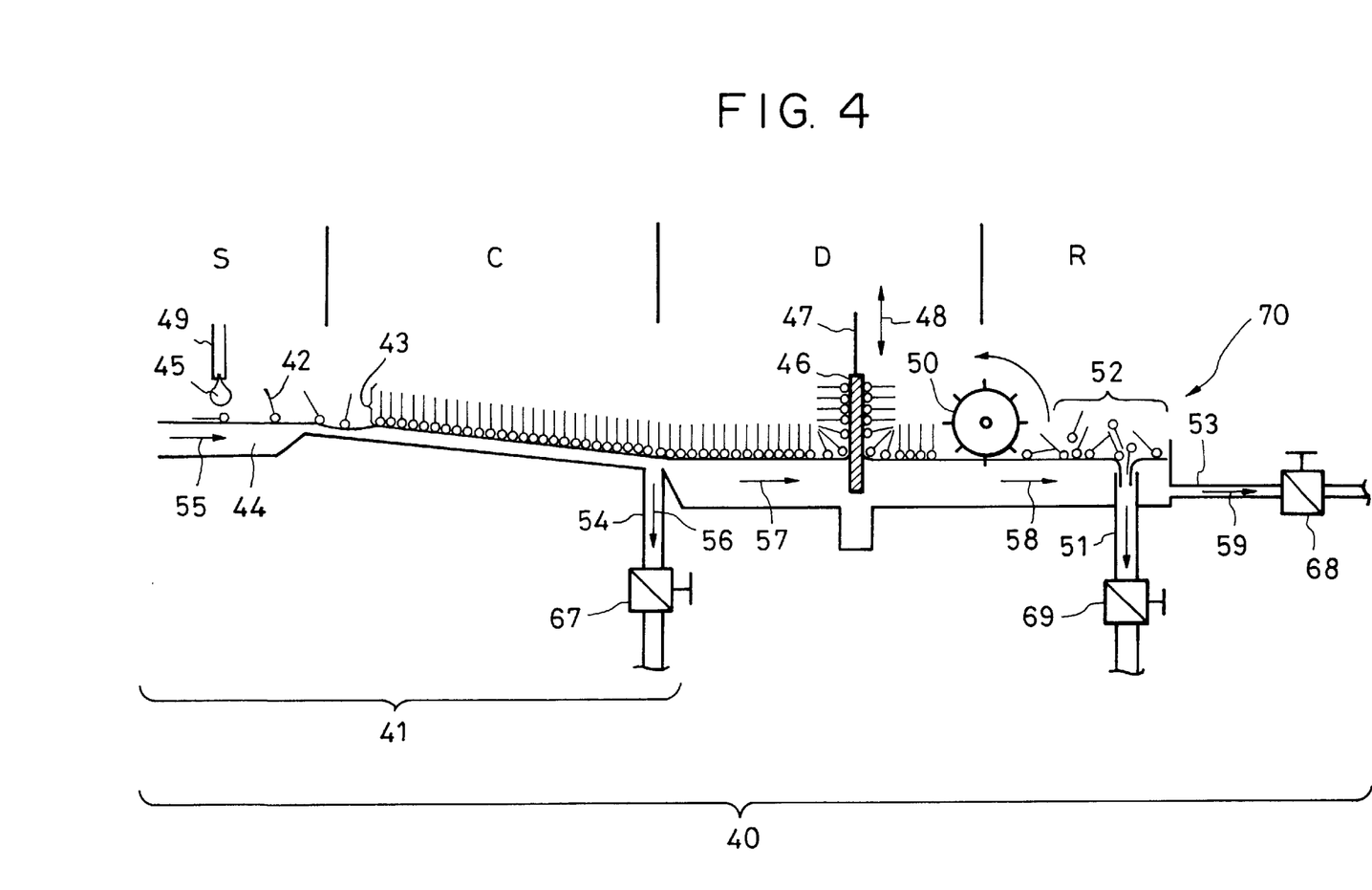
FIG. 4 is a schematic drawing illustrating the construction of an apparatus for producing a LB film in accordance with an embodiment of the present invention.
Figures 5A, 5B:
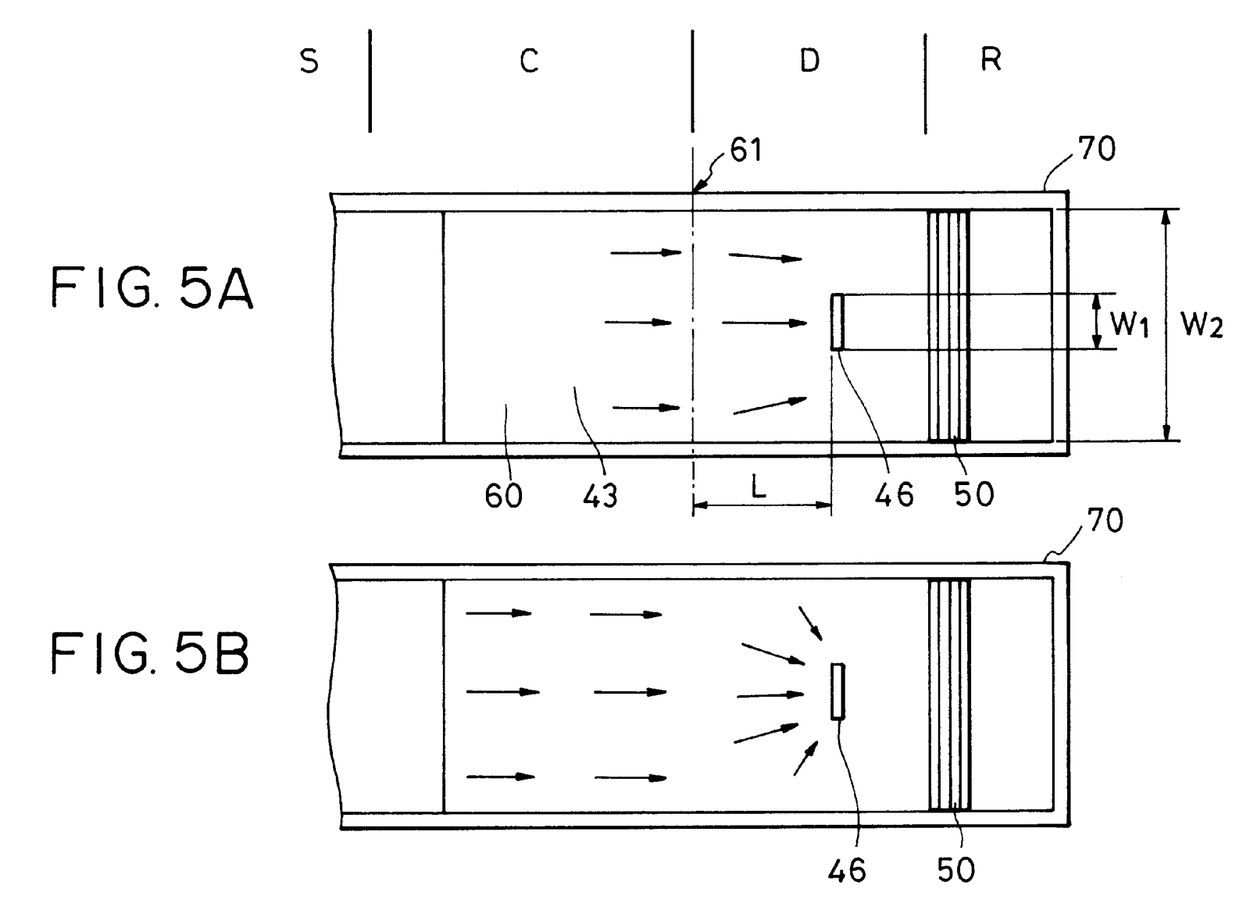
FIG. 5A and FIG. 5B are top views each illustrating the flow state of a single molecular film on a water surface in production of a LB film by using the apparatus shown in FIG. 4.

An apparatus for producing a LB film in accordance with an embodiment of the present invention will be described below with reference to FIGS. 4, 5A and 5B. FIG. 4 is a schematic sectional view showing the schematic construction of the apparatus, and both FIGS. 5A and 5B are top views of the apparatus. In the description below, the separation region DS described with reference to FIG. 7 is omitted for the sake of simplifying the description.

In the apparatus shown in FIG. 4, a water bath 70 comprises four regions, i.e., the spread region S, the compression region C, the lamination region D and the removal region R. Also the apparatus comprises a first flow path 40 capable of flowing sub-phase water 44 through the spread region S, the compression region C, the lamination region D and the removal region R in this order. The sub-phase water passing through the first flow path 40 is discharged to the outside of the water bath through a first discharge port 53. The first discharge port 53 is provided with a first valve 68. The first valve 68 is adapted for controlling the amount of the liquid discharged through the first flow path 40.

The apparatus further comprises a second flow path 41 for flowing the sub-phase water through the spread region S and the compression region C in this order, and discharging the sub-phase water to the outside of the water bath from the boundary between the compression region C and the lamination region D through a second discharge port 54. The second discharge port 54 is provided with a second valve 67. The second valve 67 is adapted for controlling the amount of the liquid discharged through the second flow path 41.

The removal region R is provided with an aspirator 51 for removing the film forming molecules 52 not laminated on a substrate 46 in the lamination region D to the outside the water bath. On the upstream side of the aspirator 51 is provided an impeller 50 for decomposing the single molecular film-not laminated on the substrate into film forming molecules. On the aspirator 51 is provided a third valve 69 for controlling the operation of the aspirator 51 by opening and closing the third valve 69.

The process for producing the LB film by using the apparatus shown in FIG. 4 will be described below.

First the process for producing the LB film having no anisotropy or low anisotropy is described. In this process, in the state where the first valve 68 is loosened to open the first discharge port 53 related to the first flow path 40, and the second valve 67 is tightened to close the second discharge port 54 related to the second flow path 41, the sub-phase water 44 is caused to flow. The sub-phase water 44 flows in turn as shown by arrows 55, 57, 58 and 59. In this state, in the spread region S, a solution 45 containing a material (having film forming molecules 42) for finally forming a single molecular film on the water surface is added dropwise from a nozzle 49 and dispersed to spread the film forming molecules 42 on the sub-phase water 44.

Then, the spread film-forming molecules 42 are continuously moved toward the compression region C along the water flow. In the compression region C, the film-forming molecules 42 are compressed to form a single molecular film 43 on the water surface in which the film-forming molecules 42 are arranged in a predetermined direction over the range from the compression region C to the lamination region D. In order to achieve uniform compression of the film forming molecules 42, it is essential to ensure a smooth and stable flow of water. In the compression region C, the bottom of the water bath is inclined so that the water surface slightly slopes downward along the flow of water. In this embodiment, the angle of inclination is 0.24° with respect to the horizontal surface. At this time, the film forming molecules may be continuously spread and compressed while the single molecular film on the water surface present in the region D is removed by using the impeller 50 and the aspirator 51. The spread speed of the film forming molecules 42 and the level of the sub-phase water 44 are controlled to keep the surface pressure of the single molecular film on the water surface at a desired value.

In this way, the LB film having no anisotropy or low anisotropy is produced on the stable water surface.

Next the process for producing a LB film having high anisotropy will be described. In this case, the first valve 68 is tightened to close the first discharge port 53, and the second valve 67 is loosened to open the second discharge port 54. This causes switching of the flow of the sub-phase water 44 from the first flow path 40 to the second flow path 41. At this time, the rotation of the impeller 50 is stopped, and the third valve 69 is closed to stop the operation of the aspirator 51 for discharging excess film forming molecules.

In this state, like in production of the LB film having no anisotropy or low anisotropy, the solution 45 containing the film forming molecules 42 is added dropwise in the spread region S. As a result, water flows in turn as shown by the arrows 55 and 56 to stop the flow of the single molecular film 43 on the water surface in the lamination region D. During this time, the spread speed of the film forming molecules 42 and the level of the sub-phase water are successively controlled so as to keep the surface pressure of the single molecular film 43 on the water surface at the desired value.

In this state, the substrate 46 is repeatedly dipped and pulled up by using a substrate moving mechanism 47 in the direction crossing the single molecular film 43 on the water surface, as shown by an arrow 48 to continuously deposit the single molecular film 43 on the surface of the substrate 46, to obtain the LB film.

In the deposition of the LB film, the flow of the single molecular film on the water surface is significantly close to the flow occurring in the LB film deposition process using batch processing shown in FIGS. 1A to 1C. This state is shown in FIGS. 5A and 5B. Namely, as shown in FIG. 5A, the initial flowing direction 60 of the single molecular film on the water surface is relatively uniform in the vicinity of the substrate, thereby manifesting low anisotropy. However, the flow converges to the substrate as deposition of the single molecular film on the water surface on the substrate proceeds, as shown in FIG. 5B, thereby manifesting anisotropy in the LB film. After an appropriate time has passed, the flow state of the single molecular film on the water surface is made (pseudo) stationary. At the same time, the substrate is changed, and the LB film is further deposited to obtain the LB film having uniform anisotropy on the new substrate. Alternatively, the LB film is first deposited on a portion of the substrate, such as a lower portion thereof which is not used later, and the LB film is then deposited on the desired region on the substrate after the flow of the single molecular film on the water surface has become (pseudo) stationary, to form the LB film having uniform anisotropy. The time required until the single molecular film on the water surface become (pseudo) stationary depends upon the size of the substrate used and the deposition rate. Also the time depends upon the position of the substrate and the relation between the sizes of the substrate and the water bath, which will be described below, and thus the time cannot be determined collectively. The simplest method of examining the state of the flow comprises observing a Teflon tape piece placed on the single molecular film on the water surface.

This process is different from the batch process shown in FIGS. 1A to 1C in that the single molecular film on the water surface is continuously supplied. Since the second discharge port 54 is present at the boundary between the regions C and D, the flow of the single molecular film on the water surface is relatively uniform in the region C, as shown in FIGS. 5A and 5B, thereby forming anisotropy in the single molecular film on the water surface in the region D. Therefore, the distance L between the boundary 61 and the substrate influences the magnitude of anisotropy of the single molecular film on the water surface. At an excessively short distance L, for example, 3 cm or less, it is difficult to provide the LB film with anisotropy. Also the ratio of the width W1 of the substrate to the width W2 of the water bath influences the magnitude of anisotropy. In general, anisotropy increases as the ratio W1/W2 decreases. In this embodiment, W2=80 cm, W1=5 cm, and L=40 cm.

Figure 6A:
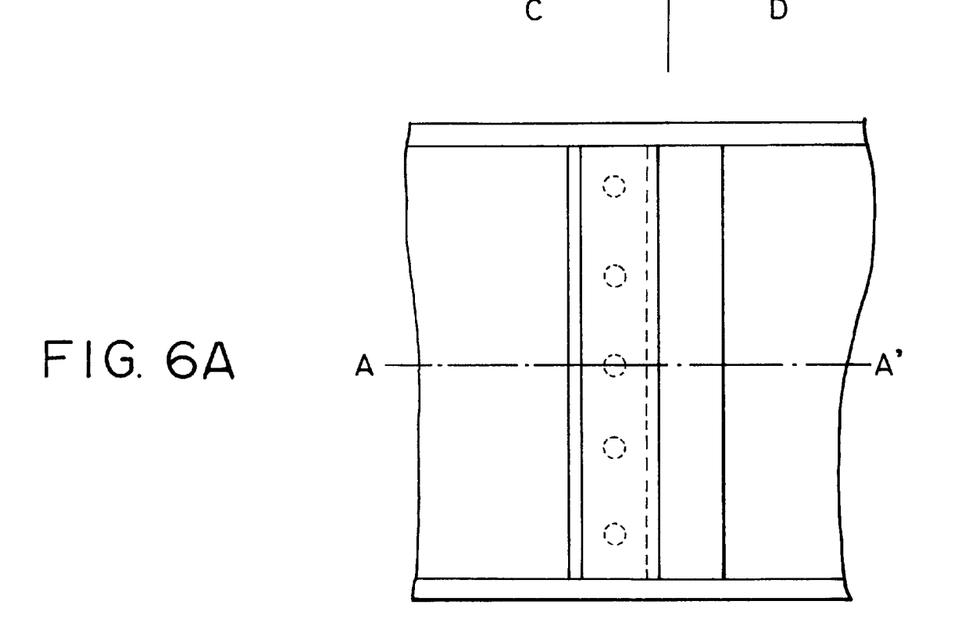
FIG. 6A and FIG. 6B are a top view and a sectional view taken along line A–A' in FIG. 6A, respectively, illustrating an example of the construction of a second discharge port of an apparatus for producing a LB film of the present invention.
Figure 6B:
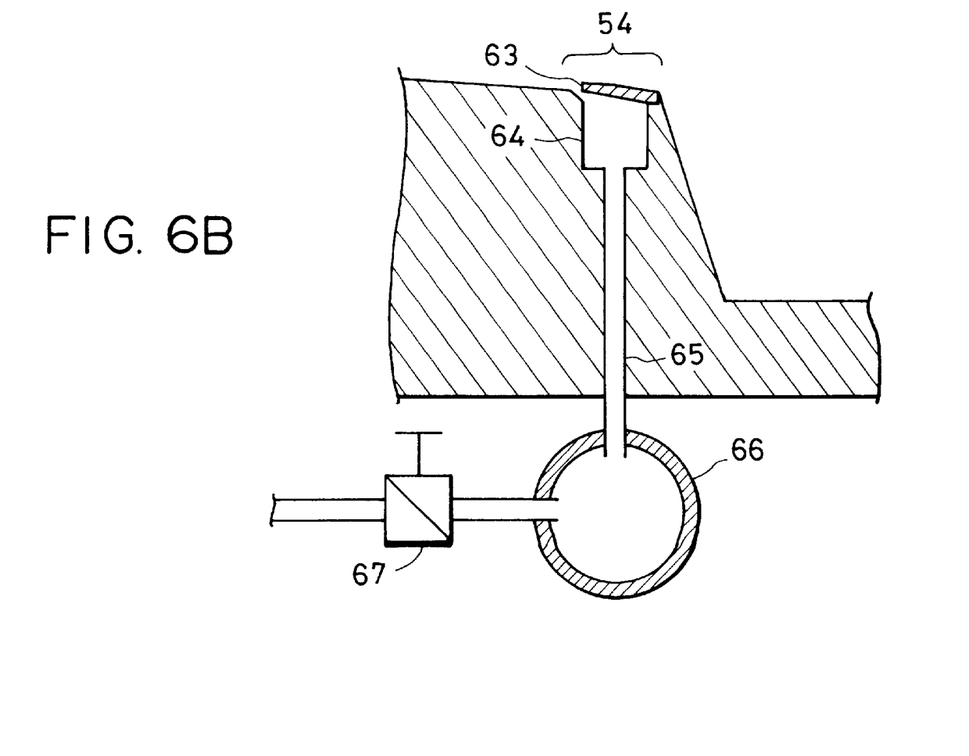

In addition, when the second discharge port 54 is opened to set the second flow path, care must be taken to prevent disturbance of the flow of water near the second discharge port 54, i.e., in the boundary between the regions C and D. If the flow of water in the region C (as described above, the flow of water in this region is required to be a laminar flow) is disturbed, not only the uniformity in the single molecular film on the water surface deteriorates, but also the control to keep the surface pressure constant is adversely affected. Therefore, in this embodiment, as the second discharge portion 54, the structure shown in FIGS. 6A and 6B is used. FIG. 6A is a top view, and FIG. 6B is a schematic sectional view.

In FIGS. 6A and 6B, since the sub-phase water is discharged through the gap between a water bath 62 and a fin 63, the gap is formed to be uniform over the whole region in order to prevent disturbance of the flow of water in the region C. In this embodiment, the gap is 1 mm. Also the surface of the fin 63 is formed to an edge-like shape so as not to affect the flow of water. The discharged water passing through the gap between the water bath 62 and the fin 63 passes through a discharge groove 64 and enters a plurality of discharge pipes 65. At this time, in order to prevent disturbance of the flow of water in the region C, it is important to make uniform the amounts of the discharged water flowing into the discharge pipes 65. Therefore, the discharged water is stored in an adjustment pipe 66 and then discharged through a second valve 67.

In this way, the use of the apparatus of the present invention permit formation of LB films having different magnitudes of anisotropy by switching the first and second flow paths. The first flow path may be switched to the second flow path at a time in the course of production of a LB film having no anisotropy or low anisotropy by using the first flow path to produce a LB film having high anisotropy.

Examples of materials which can form a LB film by using the apparatus of the present invention, and the degree of anisotropy of each of the materials will be described. In the present invention, any film materials which can form LB films by using a general LB apparatus (for batch processing) can be used. However, in some low-molecular compounds which are amorphous materials, anisotropy is hardly manifested. Therefore, it is necessary select suitable materials, e.g., crystalline materials and high-molecular materials. In this case, the method of switching from the first flow path to the second flow path is used.

Table 1 shows the magnitude of anisotropy in each of various LB films. Of film materials, each of docosanoic acid and 22-tricosenoic acid was dissolved in chloroform and then spread. For polyimide, the polyimide precursor obtained by mixing polyamic acid obtained by dehydration condensation of pyromellitic anhydride and oxydianiline with N,N-dimethylhexadecylamine at a monomer ratio of 1:2 was dissolved in dimethylacetamide and spread to deposit a film. The film was then burnt at 300° C. for 10 minutes to form polyimde. In the table, the elapsed time represents the time required until the LB film is formed on a first substrate to make the flow stationary after the flow path is switched to the second flow path, and then the first substrate is switched to a second substrate. The magnitude 1 of anisotropy represents the magnitude of anisotropy of the LB film deposited on the second substrate. The magnitude 2 of anisotropy represents the magnitude of anisotropy of the LB film deposited by using the first flow path for comparison. Each of the LB film comprises 20 layers, and the substrate comprises a silicon wafer.

TABLE 1

|  | Surface pressure mN/m | Deposition rate mm/s | Elapsed time min | Magnitude of anisotropy 1 | Magnitude of anisotropy 2 |
|---|---|---|---|---|---|
| Docosanoic acid | 27 | 2 | 5 | 10:1 | 2:1 |
| 22-tricosenoic acid | 27 | 2 | 5 | 10:1 | 2:1 |
| Polyimide | 30 | 0.05 | 20 | 1:0.6 | 1:1 |

For docosanoic acid and 22-tricosenoic acid, the magnitude of anisotropy is represented by the average ratio of the length in the direction parallel to the vertical direction of the substrate to the length in the direction perpendicular thereto with respect to the shape of the domain region observed on a polarizing microscope. For polyimide, the magnitude of anisotropy is represented by the ratio of the infrared absorption intensity measured by polarizing FT-IR (Fourier Transform Infrared) spectrometer on the assumption that the polymer main chain is parallel to the pulling-up direction of the substrate to the infrared absorption intensity measured on the assumption that the polymer main chain is perpendicular thereto.

Comparison between the magnitude 1 of anisotropy and the magnitude 2 of anisotropy reveals that the use of the apparatus of the present invention is capable of continuously producing a LB film having anisotropy.

As a result of measurement of the magnitude of anisotropy with changing numbers of layers, it was found that in samples having at least 1 to 200 layers, the magnitude 1 of anisotropy shown in Table 1 has no dependency on the number of layers and is constant, and thus a LB film comprising layers having uniform anisotropy can stably continuously be produced.

As described above, the apparatus for continuously producing a LB film of the present invention comprises a flow path passed only through the spread region and the compression region for the water flow, and is thus capable of producing a LB film having high anisotropy by continuously supplying a single molecular film on the water surface using this flow path.

What is claimed is:

1. An apparatus for producing a Langmuir-Blodgett film comprising:

(a) a liquid bath having a spread region for spreading a material for forming a monomolecular film on a liquid surface, a compression region slanted downwards from the spread region for compressing the materials spread by the spread region to form a monomolecular film, and a level lamination region for receiving the monomolecular film from the compression region and for laminating, the monomolecular film on a substrate;

(b) a first flow path for discharging a liquid which flows from the spread region of the liquid bath, to the outside of the liquid bath through the compression region and the lamination region;

(c) a first valve in said first flow path for controlling the amount of the liquid discharged through the first flow path;

(d) a second flow path for discharging the liquid, which flows from the spread region of the liquid bath to the boundary interface area between the compression region and the lamination region and thereafter to the outside of the bath;

(e) a second valve in said second flow path for controlling the amount of the liquid discharged through the second flow path; and (f) means for switching between the first and second flow paths by operation of the first and second valves.

2. An apparatus for producing a Langmuir-Blodgett film according to claim 1, wherein the liquid bath further has a removal region provided downstream of the lamination region along the first flow path, and comprises removal means for removing the monomolecular film not laminated on the substrate in the lamination region.

3. An apparatus for producing a Langmuir-Blodgett film according to claim 2, wherein the removal means comprises a rotating impeller having blades contacting the liquid surface, and an aspirator.

4. An apparatus for producing a Langmuir-Blodgett film according to claim 3, further comprising a third valve connected to the aspirator for controlling the operation of the aspirator.

5. An apparatus for producing a Langmuir-Blodgett film according to claim 1, wherein the second flow path comprises a discharge port provided at a bottom of the liquid bath in the interface between the compression region and the lamination region.

6. An apparatus for producing a Langmuir-Blodgett film according to claim 5, wherein the discharge port comprises a discharge groove provided at the bottom of the liquid bath, and a plurality of discharge pipes connecting the discharge groove and the second valve.

7. An apparatus for producing a Langmuir-Blodgett film according to claim 6, further comprising an adjustment pipe provided between the discharge groove and the second valve, for controlling the amount of the liquid discharged from the plurality of discharge pipes.

8. An apparatus for producing a Langmuir-Blodgett film according to claim 6, further comprising a fin provided on the discharge groove.

9. An apparatus for producing a Langmuir-Blodgett film according to claim 1, further comprising a nozzle for supplying the material for forming the single molecular film to the spread region.

10. An apparatus for producing a Langmuir-Blodgett film according to claim 1, further comprising a movement mechanism for moving the substrate vertically to the liquid surface.

11. An apparatus for producing a Langmuir-Blodgett film according to claim 1, wherein the liquid bath has a dividing region being shallower in depth than the spread region and the compression region spaced between the spread region and the compression region.

12. An apparatus for producing a Langmuir-Blodgett film according to claim 1, wherein the compression region of the liquid bath is shallower than the spread region and the lamination region thereof.

* * * * *

UNITED STATES PATENT AND TRADEMARK OFFICE
CERTIFICATE OF CORRECTION

| | | |
|---|---|---|
| PATENT NO. | : | 6,036,778 |
| DATED | : | March 14, 2000 |
| INVENTOR(S) | : | OTTO ALBRECHT, ET AL. |

It is certified that error appears in the above-identified patent and that said Letters Patent is hereby corrected as shown below:

COLUMN 4

Line 60, "region D" should read --region R--.

COLUMN 5:

Line 37, "continues" should read --continuous--.

COLUMN 8:

Line 12, "fllm-not" should read --film not--.

COLUMN 12:

Lin 47, "single molecular" should read --monomolecular--.

Signed and Sealed this

Seventeenth Day of April, 2001

Attest:

NICHOLAS P. GODICI

Attesting Officer                Acting Director of the United States Patent and Trademark Office